United States Patent [19]

Suzuki et al.

[11] 4,259,163

[45] Mar. 31, 1981

[54] PROCESS FOR APPLYING ANTICORROSIVE COATING ONTO AUTOMOBILE BODY

[75] Inventors: Tameyuki Suzuki, Zushi; Yoshio Shirakashi, Narashino; Nobukazu Tsutsui, Kawanishi; Sadao Yamamoto, Funabashi; Akira Kubo, Sakura; Yasuhiko Teshima, Yachiyo; Nobuo Kuranami, Narashino, all of Japan

[73] Assignee: Shinto Paint Co., Ltd., Amagasaki, Japan

[21] Appl. No.: 37,149

[22] Filed: May 8, 1979

[30] Foreign Application Priority Data

May 11, 1978 [JP] Japan ................................. 53-56012
May 11, 1978 [JP] Japan ................................. 53-56013
Jun. 27, 1978 [JP] Japan ................................. 53-77798

[51] Int. Cl.³ ............................................. C25D 13/06
[52] U.S. Cl. ............................................. 204/181 T
[58] Field of Search ............ 204/181 T, 181 C, 181 R

[56] References Cited

U.S. PATENT DOCUMENTS

| 3,998,716 | 12/1976 | Masor et al. | 204/181 T |
| 4,175,018 | 11/1979 | Gaccsa | 204/181 T |

*Primary Examiner*—Howard S. Williams
*Attorney, Agent, or Firm*—Wenderoth, Lind & Ponack

[57] ABSTRACT

A process is provided for applying an anticorrosive coating on an automobile body member. The process comprises subjecting the whole or lower portion of the body member to an electrodeposition in an aqueous bath containing (A) a cationic resinous binder and (B) a synthetic resin in the form of fine powder which is solid at room temperature but can melt at an elevated temperature, the weight ratio of (A)/(B) being 1/0.05–5. Subsequently the whole of the body member is subjected, without hardening the deposited film, to an electrodeposition in an aqueous bath containing an anionic or cationic resin. The thus treated article is washed with water and baked to effect the hardening thereof.

1 Claim, No Drawings

PROCESS FOR APPLYING ANTICORROSIVE COATING ONTO AUTOMOBILE BODY

The invention of this application relates to a process for applying a strong anticorrosive coating into an automobile body member in an economical way.

With the growth of highway networks and the increase in the speed of cars, sand and gravel snapped out by running cars (facing cars or ones own car) will often strike against the car body and cause damage of the coating thereof. (the so-called chipping phenomenon). Furthermore, in cold areas, rock salt and the like are often scattered on the road surface to prevent the freezing thereof, which will also cause additional trouble of corrosion. The present invention relates to a method of applying a strong coating, which is resistive against the attack of such sand and gravel and chemical corrosion, onto the automobile body member.

Anticorrosion of automobile body members and especially the lower portion thereof is getting more and more important from the aggravation of corrosive surrounding such as the chipping phenomenon and salt damage and the increased requirements of useful life and safety factor in high speed running of the cars. Therefore, improvement in anticorrosive effect has been one of the most important problems to be solved in the related field.

Various attempts have been proposed to cope with this subject matter such as, for example, adoption of anionic electrodeposition methods and provision of improved paints to be used in such process; adoption of cationic electrodeposition, and development and adoption of powder coating and powder electrodeposition methods.

In an electrodeposition, a great improvement in anticorrosive power may be expected with the development of cationic paint; however, the maximum (reachable) thickness of the film formed is only about 30 microns and therefore, damage of the coated film due to the impact of sand and gravel would be inevitable in a high speed running. The so-called powder paints and powder electrodeposition paints have proven to be quite useful in this field because of giving a tough and thick coating. In using these paints, an automobile body member to be coated is first subjected to a zinc phosphate treatment and then to a powder coating or powder electrodeposition coating. The thus coated member is subsequently baked to harden the same. Thereafter, the interior portion of the body member not coated with the abovesaid process is subjected to an electrodeposition coating and baking the same to effect the hardening thereof. However, in such method, a distinct line with a thinner film thickness is eventually produced at the borderline region between the coating obtained by the first half powder coating or powder electrodeposition coating method and the coating obtained by the last half electrodeposition coating method and the anticorrosive power is decreased accordingly.

More specifically, the powder particles deposited by the first half coating method are then heat-melted and made fluid, and therefore the portions deposited with powders stragglingly and dustwisely will be flowed out to form a discontinuous thin film. These portions are indeed thin, but are in hardened states and therefore exhibit insulating properties. Therefore, in the next half electrodeposition, additional paint would not be deposited thereby leaving the thin layer portions as they are. Thus, the powder coating method will result a mottled band-like thin layer and the powder electrodeposition method a linear thin layer portion. The above-mentioned method comprising applying a coat by the powder coating or powder electrodeposition coating to an article, baking the same to effect the hardening thereof, subjecting the remaining uncoated portion to a second electrodeposition and baking to effect the hardening is called as a reverse coating system. In addition thereto, a very specific anticorrosive paint comprising urethane-, polyvinyl- or bitumen series resin is optionally applied, as a thick layer, onto the portions liable to be damaged by chipping such as, for example, back floor surface, tire-house, side-seal outer surface, and the front and rear apron portions, as an impact barrier. Furthermore, in order to prevent the development of rust starting from the damaged area, the so-called anticorrosive steel plate as zinc metallized steel plate and zinchrometal steel plate is often used at the portions required. However, many of the anticorrosive steel plates still have troublesome questions on working performance as press-workability, weldability and the like, and moreover, they are still too expensive to use in the necessitated portions of body member. Thus, there is a continuing need of having an improved process for applying an anticorrosive coating on an automobile body member in regard to quality, operational easiness, economy and the like.

The present inventors, having studied this subject matter, have found a very reasonable and excellent method hereinafter stated. That is, in the present invention, the whole or a lower portion of the automobile body member is first subjected to a powder electrodeposition coating in an aqueous bath containing (A) a cationic resinous binder and (B) a synthetic resin in the form of fine powder which is solid at a room temperature but can melt at an elevated temperature, the weight ratio of (A)/(B) being 1/0.5–5, and then the whole of the body member is, without hardening the same, subjected to an electrodeposition in an aqueous bath containing an anionic or cationic resin, washed with water and baked to effect the hardening of the coated films.

According to this method, the lower portions of the body member where the maximum chipping resistance is required, as for example, floor backside portion, tire-house inside portiion, inside-seal outer portion, rear and front fenders' lower portions, and door lower portion, are covered with excellent coatings by the powder electrodeposition means, and therefore, there is no need of applying a special anti-chipping paint or using a special anticorrosive, expensive steel material thereabout. Furthermore, even compared with a conventional reverse system, this method is far advantageous in that it gives no marks around the borderline portion between the first powder electrodeposition coating and the second electrodeposition coating, and is quite economical because of the decreased number of baking furnaces and the simplified operational steps.

The coating method of this invention comprises the essential steps of (1) conducting an electrodeposition in an aqueous bath containing a binder resin and a synthetic resin in the form of fine powder (called as powder electrodeposition), (2) conducting an electrodeposition in an aqueous bath containing an ionic synthetic resin, (3) washing and (4) baking to effect simultaneous hardening of both coatings obtained in said step (1) and step (2). If necessary, an additional washing step may be included between the abovesaid steps (1) and (2). Therefore, in the present invention, an automobile body member previously treated with zinc phosphate and the like is firstly subjected to a powder electrodeposition to deposit resinous powder on the whole or lower portion thereof. After finishing washing if necessary, the whole body member is subjected to a second electrodeposition, washed with water and baked to effect the crosslink hardening of thus deposited materials at the same time. This a type of wet-reverse coating system.

In such a wet-reverse coating system, the coated film obtained by the first half powder electrodeposition is, without being hardened and in the state of poor electroinsulation, subjected to the second half electrodeposition, and an additional resinous paint can be deposited on the firstly made coating such that a larger amount of resin is placed on a thinner film portion because of its increased conductivity. Thus, in this system, the problems of borderline mark is completely eliminated. However, in a conventional wet-reverse system, since the borderline portion of both coatings especially on the outer surface of the body member often develops in stairwise between the comparatively thicker coating applied by the powder electrodeposition and the comparatively thinner coating applied by the second half electrodeposition, a special device as for example, grinding and over-coat application is normally required for the obtainment of beautiful finish thereof.

More specifically, of the outer plate of the body member, the portion dipped into the bath and facing against the anode is quite favorable for the electrodeposition and is fully deposited with resinous material, but the undipped portion is totally free from such coating. Therefore, when the whole of said body member is subjected to the subsequent electrodeposition, a distinct stairwise borderline is always appeared on the portion which corresponds to said liquid surface of the bath used in the first electrodeposition.

The inventors have completed the present ideal process by the inclusion of specific coating conditions to solve the abovementioned problem in a wet-reverse coating system.

According to this invention, the said stepwise borderline mark is effectively eliminated by the adoption of either one of the following. In the first solution, the article to be coated is first dipped into a powder electrodeposition bath to the desired depth and taken out from the bath just prior to power transmission or at the same time with the beginning of power transmission or even after the power transmission but before the occurrence of substantial electrodeposition, and the electrodeposition is caused to occur while moving the article to a predetermined distance from the bath.

In the conventional electrodeposition, the article to be coated is totally immersed into the bath or kept at the desired level in the bath and a voltage is applied between the cathode and anode under these conditions. After the formation of the coating the coated article is taken out of the bath. Whereas in the present invention, electrodeposition is carried out while taking the article out from the bath and moving the same. Therefore, depending on the take-out speed, the film thickness of the coat will vary and become thick progressively from the head to the tail in the moving direction of the article under treatment.

In the present invention, the take-out speed is usually set in a range of about 0.1 to 2.0 m/minute. Alternatively, the take-out speed may be continuously varied such that a higher speed and lower is applied in an earlier stage and later stage respectively or vice versa, depending on the coat thickness profile necessitated. To obtain a more smooth coating at the boundary area, the article may be dipped into the bath a little bit excessively than the height to where the powder electrodeposition coating has to be made, taken out from the bath, moved away for a while without applying power, and then the electrodeposition is started and ended while continuing moving of the same.

In the second solution, use is made of a comparatively lower throwing power of the powder electrodeposition paint. The powder electrodeposition paint has properties such that the greater the distance between the cathode (article to be coated) and anode, the lesser the deposition amount, and there is, of course, a limit in the maximum interelectrode distance utilized.

In this invention, this particular property is utilized and the relative positional configuration between the article to be coated and the facing anode is varied according to need. That is, the portion to be coated with a thicker film is positioned closer to the facing anode, while the portion to be coated with a thinner film or not to be coated with resinous powder is positioned more remote from the facing anode. In this case, the resinous powder will be deposited on the article in different thickness depending on the distance between the article to be coated and the anode. In some portion, no resin will be deposited because of being too far from the facing anode. The inventors have found that in the present invention, a satisfactory result is obtainable with the ratio of minimum interelectrode distance to maximum interelectrode distance of 1.5:1 and more. This ratio may be, however, determinable by the actual conditions used.

In coating an automobile body member, when the anode is placed at the bottom of the bath in parallel with the floor portion of said member, the side portion of the body member will be in perpendicular position toward the anode. In this case, the lower part of said side portion will become closer to the anode and therefore the distance between the cathode and anode will become minimum and the interelectrode distance will increase proportionally with the height of said side portion from the bottom of the bath. The side portion which is higher than the point corresponding to the maximum interelectrode distance will not be coated with the resinous material by the electrodeposition.

Thus, in the second method of this invention, the first powder electrodeposition is carried out with the ratio of minimum interelectrode distance space to maximum interelectrode distance (distance between the article to be coated and anode) of more than 1.5. According to this method, it is possible to settle the article in a coating bath and carry out the powder electrodeposition without moving the same and with deposit only onto the desired portion thereof.

Each step of the present method shall be explained in detail hereinunder.

(1) Powder electrodeposition in a bath containing a cationic resinous binder and a synthetic resin in the form of fine powder:

In the powder electrodeposition coating step, a tough, thick and anticorrosive coating capable of resisting against severe chipping and salt damage can be made on the article.

The bath used in this step contains as main ingredients, a water-thinnable cationic binder resin and a synthetic resin in the form of fine powder which is solid at a room temperature but can melt at an elevated temperature. The mixture of said binder resin and a synthetic resin in the form of fine powder is dissolved or suspended in water to obtain an electrodeposition bath. This bath contains, in general, about 10 to 20% by weight of said main ingredients, and may further contain water, certain amount of organic solvent and other additives.

In carrying out a powder electrodeposition, the article to be coated (usually pretreated with zinc phosphate) is immersed in the bath as a cathode, and a voltage is applied between the cathode and anode to cause direct current flow through the bath. The powder electrodeposition is usually carried out under conditions of an applied voltage of 50 to 600 V, a bath temperature of 15° to 35° C. and a current applying time of 10 to 180 seconds. They are, however, varied with the desired film thickness, throwing power and the like. At this time, in the present invention, the abovesaid take-out and move operation of the dipped article or the adjustment of interelectrode distance between the article to be coated and anode is practiced to eliminate the possible formation of a stairwise portion at the boundary area between the first coat thus formed and the second coat to be formed in the subsequent electrodeposition coating step. In the present bath, the weight ratio of binder resin to fine powder must be limited in a range of 1/0.5-5. This is because, if the ratio of said fine powder is less than 0.5, it may cause the failure of having a thick coating with desired anti-chipping effect whereas when the ratio exceeds 5, the failure of having the desired finish and throwing power and furthermore, may cause an additional problem of falling out of the deposited powder from the article in the subsequent electrodeposition step.

A water-thinnable cationic resin used as a binder may be prepared by providing an amine adduct of such resin as epoxy resin, aminoacrylic resin, and polyamide resin, and partially neutralizing the same with an acidic compound as lactic acid, propionic acid, formic acid and acetic acid. As the fine powder resin, use is made of such member as being able to melt at the baking step, preferably being partially or completely compatible with said binder in the molten state, and at the same time, being able to harden with the help of a hardener, catalyst or heating. For example, epoxy resin, polyester resin and/or acrylic resin are/is added with pigment, hardener and other additives and the mixture is kneaded and pulverized to form the abovesaid fine powder.

(2) Electrodeposition in a bath containing an ionic synthetic resin:

Either cationic or anionic electrodeposition can be used, however preference is given to a cationic one because of giving better finish and wider allowance of operational condition.

This electrodeposition bath contains about 5 to 20% by weight of the known anionic or cationic water-thinnable resin as maleic oil series, polybutadiene, epoxy, acrylic and polyamide resins and pigment as main ingredients, and may further contain water, certain amount of organic solvent, additive, neutralizer and the like.

In carrying out the electrodeposition, the whole article is immersed into the bath and a voltage is applied between the article to be coated and anode to cause direct current flow through the bath. The usual electrodeposition conditions are: 100-600 V, 60-180 seconds, 20°-30° C. and however, these may freely be changed depending on the desired film thickness, throwing power and the like.

After finishing the abovementioned steps (1) and (2), thus formed coatings are washed with water and baked to effect hardening thereof. By the adoption of the present method, it is possible to apply a thicker coating (30-100 microns) by a powder electrodeposition or a combination of powder electrodeposition and electrodeposition onto the lower portion of automobile body member where a strong chipping-resistance is desired to have, and a comparatively thinner coating (about 10-30 microns) by an electrodeposition onto the inner part of box constitution as side-seal inner portion or inner plate portion of body member.

The invention can thus provide an excellent anticorrosive coating on an automobile body member with a simplified and economical process and obviate the necessity of using supplemental anticorrosive materials and special anticorrosion steel materials. Particularly a strong and thick coating is applied to the lower portion of automobile body and therefore there can be obtained excellent chipping-resistance.

The following are examples of the present invention. All parts and % are by weight unless otherwise being stated.

Preparation of electrodeposition bath (1) Electrodeposition bath containing a binder resin and a synthetic resin in the form of fine powder:

A mixture of 488 parts of Epikote 1001 (trade mark of epoxy resin manufactured by Shell Oil Co.), 105 parts of diethanolamine and 250 parts of isopropylalcohol is refluxed at 80°-85° C. for 3 hours to obtain a liquid amino epoxy resin (a water-thinnable cationic synthetic resin). Apart from this, 40 parts of Epikote 1004 (Shell Oil Co.), 30 parts of Adduct B-1065 (Feba Co.), 29 parts of Titanium Oxide R-550 (Ishihara Sangyo) and 1 part of Carbon Black MA-100 (Mitsubishi Kasei) are melt-kneaded in an extruder in a conventional way, and pulverized by an impact type pulverizer into a powder mainly of epoxy resin having an average diameter of 7 microns. 143 parts of the abovementioned water-thinnable cationic synthetic resin are added with 6.2 parts of glacial acetic acid and 500 parts of deionized water, and the mixture is stirred well in a dissolver. Then 280 parts of the abovesaid fine powder are added thereto, the mixture is stirred in the dissolver for 30 minutes and then diluted with deionized water until the solid content becomes 15% by weight. The characteristics of the electrodeposition bath are pH=5.2, Po/Bi=2.8/1.

(2) Cationic electrodeposition bath:

336 parts of Epikote 1004, 143 parts of Epikote 1001 and 140 parts of ethylcellosolve are mixed together and stirring is continued until the whole ingredients are completely solved out. After heating to 50° C., a solution of 59 parts of diethanolamine and 20 parts of isopropylalcohol is added, while stirring, over 1 hour thereto, and the mixture is maintained at 80°-85° C. for 3 hours. Thereafter, a solution of 202 parts of Adduct B-1065 and 100 parts of ethylcellosolve is added over 30 minutes while stirring, and stirring is continued at 80°-85° C. for 1.5 hour to obtain an aminoepoxy isocyanate resin. Using the above-said cationic resin together with acetic acid as a neutralizer, and titanium oxide and carbon black as pigments, an aqueous electrodeposition bath is prepared in a conventional way. The characteristics of the bath are pH=5.4, ash content=25%, neutralization degree=75% and heating residue=13%.

(3) Anionic electrodeposition bath:

According to a known procedure, an electrodeposition bath is prepared by using an anionic resin comprising polybutadiene resin, triethylamine (as a neutralizer), and titanium oxide and carbon black (as pigments). The characteristics of the bath are: pH=7.8, ash content=26% and heating residue=13%.

EXAMPLE 1

An automobile body member to be coated was pretreated with zinc phosphate (Bondelite 137 T), washed well with pure water and drain-dried at 150° C. The thus treated article was fully immersed into the abovesaid electrodeposition bath containing fine powder, as a cathode, and a voltage was applied between the cathode and anode to cause direct current flow through the bath. The powder electrodeposition conditions were: voltage 400 V; current applying time 40 seconds; bath temperature 27° C.; interelectrode distance (minimum) 40 cm; and electrode ratio (facing anode area/total area of outer surface of the body member) about 1/1. After removing the body member from the bath it was washed well with water and thereafter immersed into the abovesaid cationic electrodeposition bath to conduct the subsequent electrodeposition. The employed conditions were: voltage 250 V; current applying time 210 seconds; bath temperature 28° C.; interelectrode distance (minimum) 45 cm; and electrode ratio about 2. After removing from the bath, thus treated body member was washed well with water, drain-dried at 80°–100° C. and baked at 190° C. for 20 minutes to effect the cross-link hardening thereof.

COMPARATIVE EXAMPLE 1

After treating an automobile body member in an electrodeposition bath containing fine powder under the same conditions as stated in Example 1, the article was washed with water, drain-dried at 80°–100° C., baked at 180° C. for 15 minutes to effect the hardening of the coated film, and allowed to cool. Thus treated article was then immersed into the electrodeposition bath containing cationic synthetic resin and a voltage was applied between the cathode and anode under the same conditions as stated in Example 1. Thereafter, the article was washed with water, drain-dried at 80°–100° C. and baked at 190° C. for 20 minutes.

Both body members of Example 1 and Comparative Example 1 were then coated with a second coating and topcoating as usual, and then subjected to various tests. The results are shown in the following Table 1.

TABLE 1

| | Example 1 | Comp. Example 1 |
|---|---|---|
| 1. Appearance of the article without a second coating: | | |
| General finish | good | good |
| Film thickness (bottom portion of door applied with powder electrodeposition coating) | 55 microns | 50 microns |
| Appearance at the borderline on the inside portion of door | No stepwise difference, no thinner portion, good | Stepwise difference, some thinner portion |
| 2. Properties of the article without a second and a top coatings: | | |
| Anticorrosion at the borderline appeared on the inside portion of door | No rust after 800 hrs salt spray exposure | Rust after 400 hrs salt spray exposure |
| Anti-chipping property of outer plate of door | Little rust after gravelometer test (2 Kg pressure × 500 g granite) and successive 240 hrs salt spray exposure | The same as the left |
| 3. Properties of the article with a second and a top coatings: | | |
| Anti-chipping property of outer plate of door | Very little rust after gravelometer test (4 Kg pressure × 500 g granite) and successive 240 hrs salt spray exposure test | The same as the left |
| | No rust after gravelometer test (2 Kg pressure × 500 g granite) and successive 240 hrs salt spray exposure test | The same as the left |

EXAMPLE 2

An automobile body member to be coated was treated with zinc phosphate (Bondelite 137 T), washed well with water and drain-dried at 150° C. Thus pretreated body member was placed in an electrodeposition bath containing a cationic binder resin and a synthetic resin in the form of fine powder so that the door portion was immersed in the bath up to 10 cm height from the bottom line thereof and a voltage was applied between the cathode (article to be coated) and anode to cause direct current flow through the bath. The powder electrodeposition conditions were: voltage 400 V; current applying time 40 seconds; bath temperature 27° C.; interelectrode distance (minimum) 40 cm; electrode ratio (immersed outer plate area/facing anode area) about 1/1. After removing from the bath, the article was washed with water and drain-dried at 80° C. for 10 minutes in a hot air. Thus obtained coating is easily soluble in butyl cellosolve. The article was then immersed in an anionic electrodeposition bath and electrodeposition was carried out under conditions: voltage 230 V; current applying time 240 seconds; bath temperature 28° C.; interelectrode distance (minimum) 50 cm. Thereafter, the article was washed well with water, drain-dried at 80°–100° C. and baked at 190° C. for 20 minutes.

COMPARATIVE EXAMPLE 2

Using the same procedures as stated in Example 2, a pretreated automobile body member was electrodeposited in a bath containing a resinous binder and a synthetic resin in the form of fine powder. Thereafter, the article was washed with water, drain-dried at 80°–100° C. and baked at 180° C. for 15 minutes to effect the cross-link hardening thereof. After cooling, the article was immersed into an anionic electrodeposition bath and treated in the same way as in Example 2. The article was then washed with water, drain-dried at 80°–100° C. and baked again at 190° C. for 20 minutes. The results of Example 2 and Comparative Example 2 are shown in Table 2.

TABLE 2

|  | Example 2 | Comp. Example 1 |
|---|---|---|
| 1. General appearance excepting borderline portion | Good | Good |
| 2. Appearance at the borderline portions: | | |
| Borderline on the outer plate of door | Good, little stepwise but no thinner portion | Stepwise difference and some thinner portion |
| Borderline on the inner plate of door | Good, no thinner portion | Stepwise difference and some thinner portion |
| 3. Properties at the borderline portions: | | |
| Borderline on the outer plate of door | No rust after 800 hrs salt spray exposure test | Rust after 400 hrs salt spray exposure test |
| Borderline on the inner plate of door | No rust after 800 hrs salt spray exposure test | Rust after 300 hrs salt spray exposure test |

COMPARATIVE EXAMPLE 3

Powder electrodeposition baths with the ratio of fine powder/binder resin of 0.3/1 and of 6/1 were prepared and the same procedures as stated in the preceding Examples were repeated with these baths. The maximum thickness of the film obtained in the former case was only 20 microns and the film obtained in the latter case was over 100 microns. Appearance and performance of thus obtained films were no good.

EXAMPLE 3

The electrodeposition bath liquid containing a binder resin and a synthetic resin in the form of fine powder was placed in an insulating bath tub (depth about 130 cm × width 130 cm × length 150 cm) and an anode made of stainless steel was placed in the bath along one side wall and in a longitudinal direction thereof. An automobile body member pretreated with zinc phosphate was then put in the bath so that the outer plate of door was faced, in parallel, against the anode and the door was in the bath up to 40 cm height from the bottom line thereof. The body member was then removed from the bath in the perpendicular direction at a rate of 80 cm/minute, and at the same time, a voltage of 170 V was applied between the cathode and anode to cause direct current flow through the bath. The bath temperature was about 25° C. Thus removed article was then washed with water. Thereafter, the door member was immersed in the aforesaid electrodeposition bath, a voltage of 200 V was applied between the cathode (door member) and anode for 180 seconds, the door member was removed from the bath and washed with water. After keeping standing for about 10 minutes, the article was drain-dried and baked at 190° C. for 20 minutes in a hot air. The thickness of the coated film was 56 microns at the lowest portion of the door, 15 microns at the 40 cm height from the bottom, and 15 microns at the more upper portion thereof, respectively. No stepwise difference was found between the coats applied with these two electrodepositions.

COMPARATIVE EXAMPLE 4

The same procedures as stated in Example 3 were repeated excepting omitting the pick-up operation in the powder electrodeposition step. The thickness of the coated film was 40 microns at the 40 cm height from the bottom and 15 microns at the more upper portion of the door, and thus there was a distinct stepwise difference in thickness between the both coatings.

EXAMPLE 4

An anode made of stainless steel plate (width 6 cm × length 20 cm) was laid flat at the bottom face of the same powder electrodeposition bath with that of Example 3. In this bath, was placed the same automobile door member as stated in Example 3 in an upright position. The distance between the lowest portion of the door member and the anode (minimum interelectrode distance) was maintained at 50 cm. A voltage of 170 V was then applied between the cathode and anode to cause direct current flow through the bath for 20 seconds. In this case, the powder electrodeposition paint was deposited up to 80 cm height from the bottom of the door (maximum interelectrode distance) (the ratio of maximum to minimum interelectrode distance being 1.6:1). Thereafter, the door member was treated in the same way as stated in Example 3.

The thus obtained door member showed the film thickness at the lowest part of 40 microns, the film thickness at 80 cm height from the bottom of 16 microns and the film thickness at the upper portion of 16 microns, and thus there was no stepwise difference in thickness at the borderline portion of both coatings.

What we claim is:

1. A process for applying an anticorrosive coating on an automobile body member which comprises subjecting the lower portion of the body member to a first electrodeposition in an aqueous bath containing (a) a cationic resinous binder and (b) a synthetic resin in the form of fine powder, which is solid at room temperature but can melt at an elevated temperature, the weight ratio of (a)/(b) being 1/0.5–5, by applying a voltage between the said body member as the cathode immersed at its lower portion in the electrodeposition bath and a counter-electrode as the anode in said bath, while withdrawing the said body member upwardly out of said electrodeposition bath, and then subjecting the whole body member without hardening the first deposited film to a second electrodeposition in an aqueous bath containing an anionic or cationic resin, washing the thus treated article with water and baking the same to effect hardening of the coating.

* * * * *